United States Patent
Kim et al.

(10) Patent No.: US 9,992,410 B2
(45) Date of Patent: Jun. 5, 2018

(54) APPARATUS AND METHOD PHOTOGRAPHING IMAGE

(71) Applicant: Samsung Electronics Co., Ltd., Gyeonggi-do (KR)

(72) Inventors: Moonsoo Kim, Seoul (KR); Hongsuk Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 483 days.

(21) Appl. No.: 14/182,674

(22) Filed: Feb. 18, 2014

(65) Prior Publication Data
US 2014/0240453 A1   Aug. 28, 2014

(30) Foreign Application Priority Data
Feb. 26, 2013   (KR) .................. 10-2013-0020767

(51) Int. Cl.
*H04N 5/232* (2006.01)
*H04N 5/225* (2006.01)
*H04N 5/272* (2006.01)

(52) U.S. Cl.
CPC ....... *H04N 5/23238* (2013.01); *H04N 5/2258* (2013.01); *H04N 5/272* (2013.01)

(58) Field of Classification Search
CPC ... H04N 5/2258; H04N 5/23238; H04N 5/272
See application file for complete search history.

(56) References Cited

U.S. PATENT DOCUMENTS

| | | | | |
|---|---|---|---|---|
| 7,583,316 | B2* | 9/2009 | Miyashita | H04N 5/2252 348/333.05 |
| 2003/0058255 | A1* | 3/2003 | Yamagishi | H04N 1/00204 345/619 |
| 2008/0095526 | A1 | 4/2008 | Chang | |
| 2010/0111429 | A1* | 5/2010 | Wang | G06T 3/4038 382/233 |
| 2010/0289922 | A1* | 11/2010 | Brenner | G06T 3/4038 348/231.99 |
| 2011/0181688 | A1* | 7/2011 | Miyamoto | G01B 15/04 348/36 |
| 2011/0234832 | A1* | 9/2011 | Ezoe | H04N 5/232 348/222.1 |
| 2012/0120186 | A1 | 5/2012 | Diaz et al. | |
| 2012/0218377 | A1 | 8/2012 | Oku | |
| 2012/0218431 | A1 | 8/2012 | Matsuoto et al. | |

(Continued)

OTHER PUBLICATIONS

European Search Report, dated Nov. 17, 2016.

*Primary Examiner* — Md Haque
(74) *Attorney, Agent, or Firm* — Cha & Reiter, LLC

(57) ABSTRACT

A method and apparatus for photography using an electronic device. The method and apparatus include a preview display operation of displaying a first image output from a first image sensor as a main image, and displaying a second image photographed by a second image sensor as a sub-image. A panorama photography operation of buffering the main image is executed when a panorama photography operation is requested. The sub-image is captured from a preset frame. When the panorama photographing operation is terminated, a composition panorama is generated from a panorama image of the main image, and compositing with the captured sub-image.

15 Claims, 11 Drawing Sheets

(56) References Cited

U.S. PATENT DOCUMENTS

2012/0229597 A1* 9/2012 Gagel .................. G06T 15/205
                                                            348/36
2012/0274827 A1* 11/2012 Ohdate ............. H04N 5/23245
                                                         348/333.01
2013/0335521 A1* 12/2013 Lin .................... H04N 13/0203
                                                            348/36

* cited by examiner

APPARATUS AND METHOD PHOTOGRAPHING IMAGE

CROSS REFERENCE TO RELATED APPLICATION

This application claims the benefit under 35 U.S.C. § 119(a) of a Korean patent application filed on Feb. 26, 2013 in the Korean Intellectual Property Office and assigned Serial No. 10-2013-0020767, the entire disclosure of which is hereby incorporated by reference.

TECHNICAL FIELD

The present disclosure relates to photography, and more particularly, to digital photography.

BACKGROUND

Digital photography typically involves display of image data acquired from an image sensor of a camera, and capture, compression and encoding of acquired image data to be stored in memory when a user executes a photographic capture command.

A typical portable terminal may be equipped with dual cameras, one of higher resolution and one of lower resolution. The higher resolution camera and the lower resolution camera may be mounted on a front surface and a rear surface of the portable terminal, respectively. A device so equipped may independently utilize the front camera and the rear camera to simultaneously photograph two images, but is generally unable to combine the images automatically. Pictures are thus typically taken sequentially, being composed and/or combined through post-processing. This may require manually arrangement of the respective images.

SUMMARY

The present disclosure a method and apparatus for generating composite panorama images. An electronic device may include a first image sensor to buffer a main image series and a second image sensor to generate a sub-image, photograph a panorama image including the buffered main image series using at least one image sensor, compose the photographed panorama image with the sub-image, and store the composed image. The electronic device according to the present disclosure may photograph one panorama image and a still image, and may photograph a plurality of panorama images.

Further, the electronic device may include capture of a still image in a preset frame interval of the main image series. The electronic device may composite a second panorama image of sub-images with a main image panorama image to generate a composite panorama image having a picture-in-picture (PIP) type format, or it may composite the sub-image panorama image with the main image panorama image in a parallel or sequential format.

In accordance with one example embodiment of this disclosure, a method of photographing an image in an electronic device includes: a preview display operation displaying a first image output from a first image sensor as a main image, and displaying a second image from a second image sensor as a sub-image, a panorama photography operation buffering the first image when panorama photography is requested in a preview display operation, capturing the second image from a preset frame, displaying the first image and the second image as the main image and the sub-image respectively, a composition panorama display operation of generating the buffered first image as a panorama image responsive to termination of the panorama photographing operation, and compositing the captured second image with the panorama image.

In accordance with another example embodiment, a method of photographing an image in an electronic device equipped with a dual image sensor includes a preview display operation of displaying a first image output from a first image sensor as a main image, and displaying a second image output from a second image sensor as a sub-image. A panorama photography operation of buffering the first image and the second image when panorama photographing is requested in the preview display operation. The first image and the second image are displayed as the main image and the sub-image respectively. A composition panorama image is generated from the buffered first image and the buffered second image when the panorama photography operation is terminated, the images composited to form the composition panorama image.

In accordance with another example embodiment, an apparatus for photographing an image includes a first image sensor and a second image sensor, a display unit configured to display a first image output from a first image sensor as a main image, and a second image photographed by a second image sensor as a sub-image image. A controller buffers the first image when panorama photography is requested, and captures the second image from a preset frame. The panorama image is generated from the buffered first image when the panorama photography is terminated, and composited with the captured second image before being displayed on the display unit.

BRIEF DESCRIPTION OF THE DRAWINGS

The above features and advantages of the present disclosure will be more apparent from the following detailed description in conjunction with the accompanying drawings, in which.

DETAILED DESCRIPTION

Figure 1:
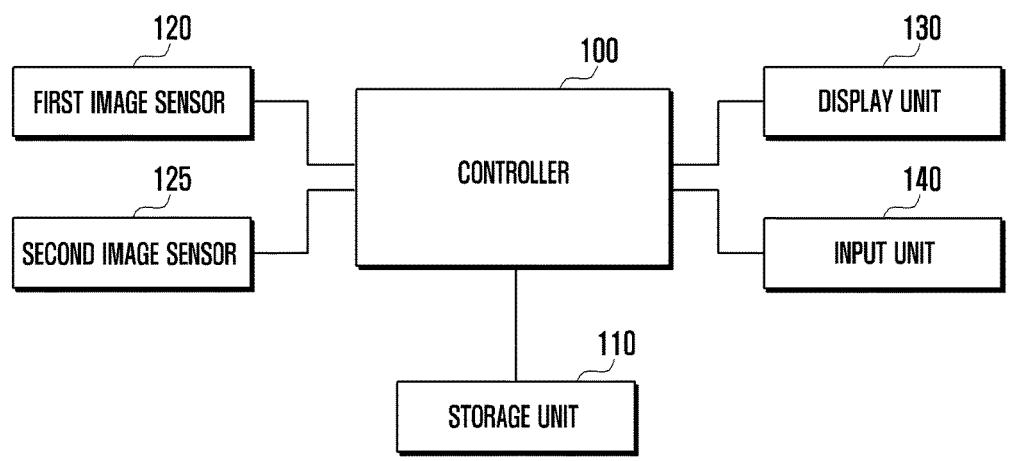
FIG. 1 is a block diagram illustrating an example configuration of an electronic device according to one embodiment.

Example embodiments of the present disclosure are described with reference to the accompanying drawings. For the purposes of clarity and simplicity, detailed descriptions of well-known functions and structures incorporated herein may be omitted to avoid obscuring the subject matter of the present disclosure.

A portable terminal equipped with an image sensor according to an embodiment of the present disclosure includes a plurality of image sensors. The portable terminal may be used to photograph a panorama image by using at least one image sensor among the plurality of image sensors, and compose the photographed panorama image with another image photographed by the other image sensor. The composite image may be stored. The images are composited by combining frame images generated from the image sensor such that one may partially overlap the other, creating a composite panorama image.

Hereinafter, the camera device (or the apparatus equipped with the image sensor) will be described as an electronic device. The electronic device may be a device including a smart phone, a tablet device, a computer, and a camera device. Furthermore, the electronic device may be a device including two or more image sensors.

A first embodiment of the present disclosure may photograph a panorama image by using a first image sensor generating a main image, generate a still image by using a second image sensor generating a sub-image image, and compose the still image with the panorama image to obtain the sub-image upon composition of the image. In this case, a location of the sub-image composed with the panorama image may be a first frame interval, a final frame interval, or a preset frame interval of the panorama image. The sub-image may be composed with the panorama image in a Picture-in-Picture (PIP) type format. In addition, the sub-image may be composed with the main image in parallel on the panorama image.

A second example embodiment of the present disclosure may photograph a first panorama image by using a first image sensor to generate a main image, generate a second panorama image by using a second image sensor generating a sub-image image, and compose the second panorama image with the panorama image upon composition of the image. The second image sensor may photograph an image of a user. Upon generation of the second panorama image, the electronic device may compose the remaining frame images, except for the frame image with a face, and including the face through face detection, to generate a panorama image. In this case, the second panorama image may be generated simultaneously with the first panorama image by simultaneous photographing. Further, a second panorama image may be generated by driving the second image sensor during generation of the first panorama. In addition, when composing the second panorama image with the first panorama image, the second panorama image may be composed with the first panorama image in a PIP type or format, and the second panorama image may be composed with the first panorama image in parallel.

A first image sensor mounted at a first surface of the apparatus may be, for example, the image sensor mounted at a rear surface of the apparatus. A second image sensor mounted at a second surface of the apparatus may be, for example, the front image sensor mounted at a front surface of the apparatus. Moreover, the image sensor may include image sensors which are functionally connected using, for example, wireless connection solutions such as Near Field Communication (NFC), wireless fidelity (WIFI), etc., in addition to an image sensor connected to the terminal.

FIG. 1 is a block diagram illustrating an example configuration of an electronic device according to one embodiment. Hereinafter, it is assumed that the electronic device equipped with a plurality of image sensors is an apparatus equipped with a dual image sensor.

Referring to FIG. 1, a first image sensor (i.e., the rear image sensor) 120 may be mounted at a rear surface of the apparatus, and a second image sensor (i.e., the front image sensor) may be mounted at a front surface of the apparatus. Here, the first image sensor 120 may be a high resolution image sensor having a resolution greater than that of the second image sensor 125. The first image sensor 120 or the second image sensor 125 may be independently or simultaneously controlled by the controller 100. Furthermore, the first image sensor 120 or the second image sensor 125 may be configured to photograph a still image or a moving image.

The controller 100 may control the overall operation of the electronic device. Further, the controller 100 may provide control and coordination for the first image sensor 120 and/or the second image sensor 125 respectively, and may simultaneously drive the first image sensor 120 and the second image sensor 125. When the first image sensor 120 and the second image sensor 125 are simultaneously driven, the controller 100 may display preview images which are photographed in a preview mode as a dual-picture format on the display, and coordinate the capture of preview images displayed on the display. The sub-image may be displayed as a PIP type.

Furthermore, the controller 100 may photograph a panorama image by using at least one image sensor among a plurality of image sensors in a preview mode. When storing the panorama image, the controller 100 may combine an image photographed from another image sensor with the photographed panorama image to create a composite panorama image, encode and store the composition image. Upon photographic capture of the panorama, the controller 100 photographs frame images generated by the first image sensor 120 and/or the second image sensor 125 such that the captured images partially overlap with each other, and overlays corresponding partial captured images to create a composite panorama image.

The storage unit 110 may include memory to store an operating system of the electronic device and a program for creating the composite panorama images according to an embodiment of the present disclosure, and data memory to store images.

The display unit 130 may be mounted at a front surface of the electronic device. The display unit 130 may be configured to display an image photographed by the first image sensor 120 and/or the second image sensor 125. The display unit 130 may be, for example, an LCD type or an OLED type display. The input unit 140 may generate inputs to control photographic functions of the electronic device. The display unit 130 and the input unit 140 may be configured to receive inputs via an integrated touch screen component.

The controller 100 may execute capture of a plurality of images by simultaneously driving the first image sensor 120 and the second image sensor 125 in a photographic "dual-mode," and display the acquired images on the display unit 130, with a first image captured by one image sensor displayed as a main image and a second image captured by the other image sensor as a sub-image. The controller 100 may swap the main image and the sub-image according to user need and indication while in a preview mode.

The controller 100 may include an image signal processor, and the image signal processor may include an image preprocessor, a postprocessor, an image scaler, and a coder and decoder (CODEC). In this case, a first image output from the first image sensor 120 may be image-preprocessed and post-processed by the image processor, and may be scaled to a main image size of the display unit 130 by the image scaler. Further, a second image output from the second image sensor 125 may be image-preprocessed and post-processed by the image processor, and may be scaled to a sub-image size of the display unit 130 by the image scaler. In this case, the sub-image may have a size of a PIP or a size of a main image.

Furthermore, the electronic device may drive at least one of the first image sensor 120 or the second image sensor 125 to photograph a panorama shot when panorama shot is requested in a "dual-mode." To this end, the controller 100 may display a panorama photographing mode button on a screen in a preview mode, or a button capable of setting a photographing mode on the screen. The "panorama photographing" mode may display a menu capable of setting a single panorama mode (i.e., a "first panorama photographing mode") which captures a main image panorama and photographs a sub-image as a still image, and a "multiple panorama" mode (i.e., a "second panorama photographing mode") which captures as two panoramas, as both the main image and the sub-image are panorama images. The "panorama photographing" mode may display a menu offering a simultaneous photographic capture mode and a sequential photographic capture mode when the "multiple panorama" mode is selected.

If the user selects a panorama photographing mode (i.e., either the first or second panorama photographing mode), the user may photograph while rotating the camera along a uniform plane of rotation while maintaining an on-state of a shutter switch (e.g., a state in which the camera is configured to capture images) for a preset time or arc of rotation. The uniform plane of rotation means a movement direction of electronic device that does not move vertically or horizontally when photographing while moving horizontally or vertically, respectively. Furthermore, the reason that the electronic device is rotated at a constant speed is that respective adjacent frame images photographed by the image sensor may overlap with one another. In this case, one example ratio of percentage overlap between the frames may range from 30% to 50%. The image processor of the controller 100 may continuously buffer frames output from the image sensors 120 and/or 125, remove overlapping portions from each frame when terminating panoramic capture, and connect/composite the frame images to generate assembled panoramic images.

An operation of a panorama photographing mode according the first embodiment of the present disclosure is illustrated. When panorama capture is requested in a preview mode, the controller 100 may continuously acquire and buffer frame images of a main image generated from the first image sensor 120, capture a specific frame image of the second image sensor generating a sub-image as a still image, and compose the still image with the panorama image as the sub-image when the panorama photographing is terminated. A position of the sub-image composed with the panorama image may be a first frame interval, a final frame interval, or a preset frame interval of the panorama image. In this case, the sub-image may be composed with the panorama image in a PIP type format, or alternatively in a parallel or sequential format.

Figure 2:
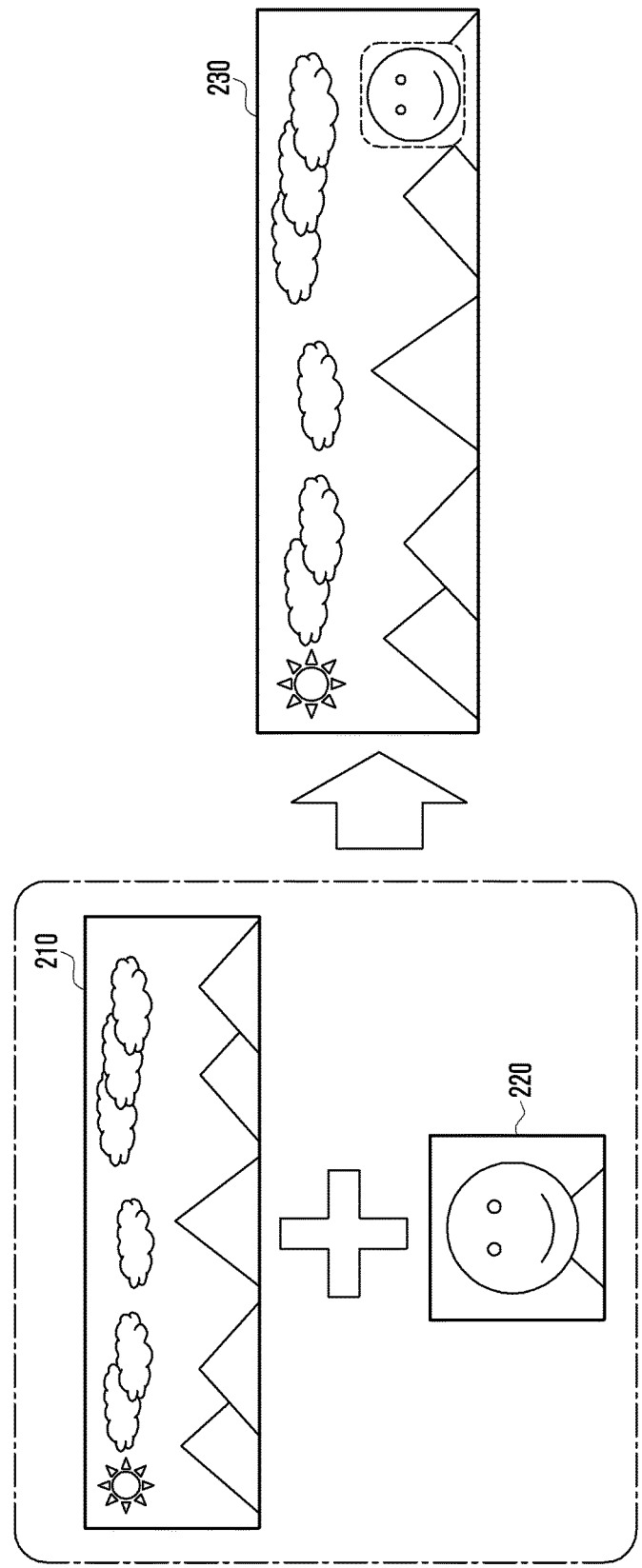
FIG. 2 is an abstract illustration of panorama photography according to an example embodiment.

FIG. 2 is an abstract illustration of panorama photography according to an example embodiment.

Referring to FIG. 2, upon receiving a command to execute panorama photographic capture while in a preview mode, the user may capture a panorama image by uniformly maintaining rotation of the electronic device at constant speed. The controller 100 may continuously process and buffer frame images generated from the first image sensor according to rotation of the device. The images of each frame may include overlapping portions according to a desired ratio between images of the previous frame and next frame. The controller 100 may capture a second image generated from the second image sensor 125 at a preset time point, and then process and buffer the captured second image as a sub-image, as illustrated in reference numeral 220 of FIG. 2. Next, if the panorama photography is terminated, the controller 100 removes each overlapped image portion from the buffered frame images and composites the remaining portions of each image to generate a panorama image main image as illustrated in reference numeral 210 of FIG. 2. The sub-image 220 is composited with the panorama image 210 to generate and store a composite panorama image as illustrated in reference numeral 230 of FIG. 2 in the storage unit 110.

To acquire the sub-image 220, the controller 100 may capture a first frame image, a final frame image, or a preset frame image of the range of possible sub-images in the panorama photographing mode. Typically, panoramic capture involves steady rotation of the electronic device at constant speed while maintaining a uniform rotation surface. Certain actions, such as the need to hold down a shutter or capture button, may cause this operation to be more cumbersome. Accordingly, the controller 100 may also include a timer function. The controller 100 may thus operate a timer upon execution of panorama photography, the controller 100 also capturing a second image generated from the second image sensor 125 during panorama photographing upon termination of the timer.

Furthermore, as illustrated in reference numeral 230 of FIG. 2, when compositing the sub-image image with the panorama image, the sub-image may be composited within a final frame interval of a panorama image, a first frame interval of the panorama image, or within some intermediary frame interval.

Hereinafter, an operation of an example panorama photographing mode (i.e., a "second panorama photographing mode") according to another example embodiment will be illustrated. When photographing the panorama image in a preview mode, the user may perform panorama photography by rotating the electronic device at constant speed, in which the first image sensor 120 and second image sensor 125 capture frames, as described above. The controller 100 may buffer a first image and a second image of each frame generated from the first image sensor 120 and the second image sensor 125 as the electronic device is rotated. Upon termination of panorama photography, the controller 100 may remove overlapping portions from the first image and the second image to generate a first panorama image and a second panorama image, and composite the generated panorama image. In this case, the second image may include the image of the user/photographer. In one embodiment, the user's image is contained within a particular frame image interval. Upon generation of the second panorama image, the controller 100 may compose one frame image including the user's face with remaining frame images that exclude the user's face (via detection of the face) to generate a panorama image.

When photographing the first and second panorama images, the controller 100 may generate a panorama image by simultaneous photography of the first image sensor 120 and the second image sensor 125. Furthermore, the controller 100 photographs the first panorama image by sequential photographing and then photographs a second panorama image. In the latter case, when performing an operation for photographing the second panorama image in a state in which the first panorama image is still being photographed, the cumbersomeness of the operation may affect the panorama photographing operation, because of the need to rotate the electronic device at constant speed while maintaining a uniform elevation and avoid lateral movement or tilting. Accordingly, the controller 100 may include a timer that controls photographic capture of a panorama image, and capture of a second panorama image via buffering each frame generated from the second image sensor 125 captured during the panorama photographing operation upon termination of the timer. When composing the second panorama image with the first panorama image, the controller 100 may compose the second panorama image with the first panorama image in a PIP type format, or compose the second panorama image with the first panorama image in parallel.

Figure 3:
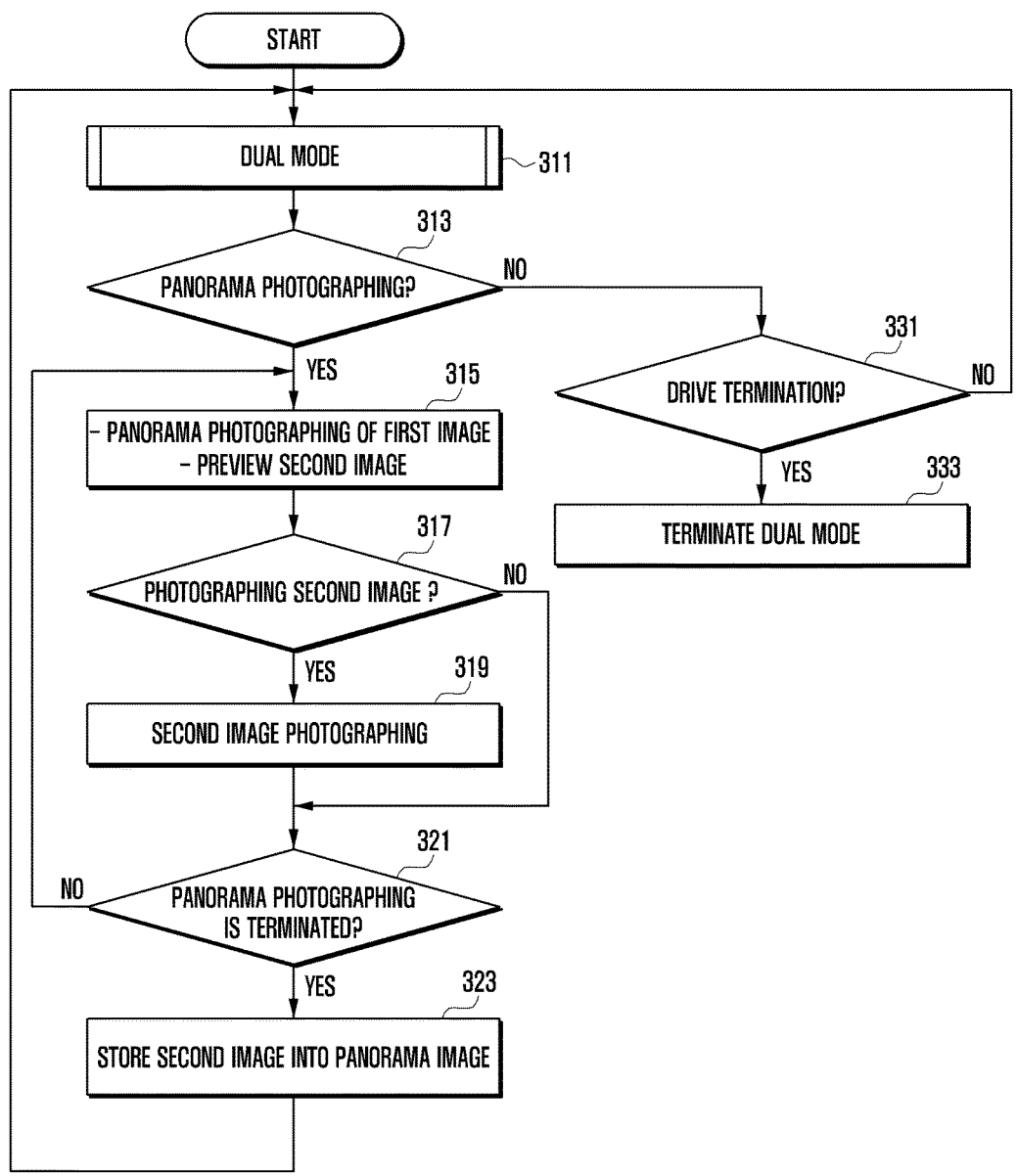
FIG. 3 is a flowchart illustrating an example sequence of steps for photographing a panorama image according to an example embodiment.
Figure 4A:
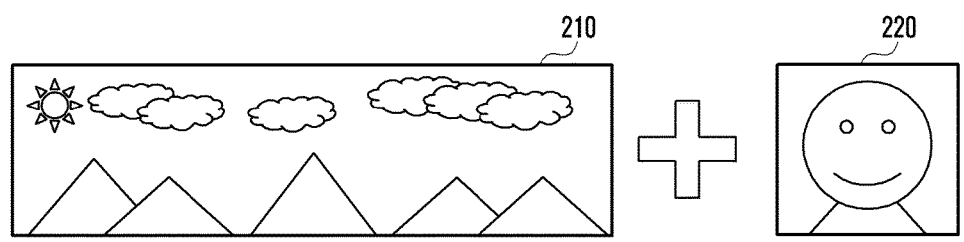
FIG. 4A is an abstract illustration of example panorama photography according to an example embodiment.
Figure 4B:
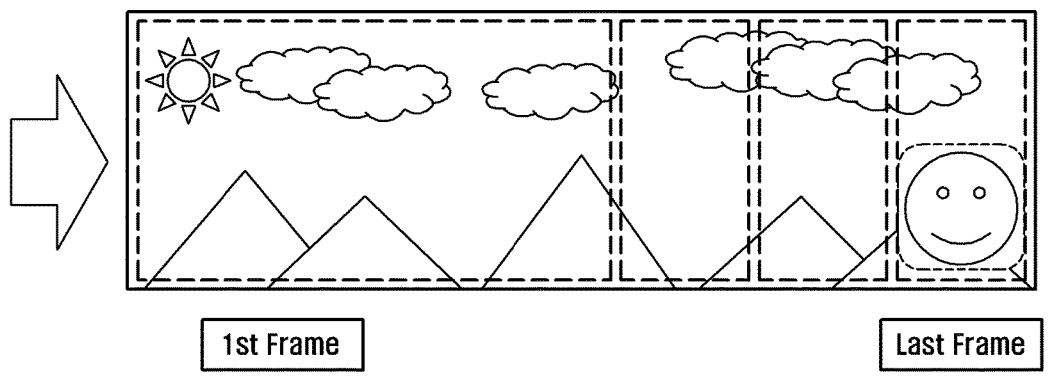
FIG. 4B is an abstract illustration of example panorama photography according to an example embodiment.
Figure 4C:
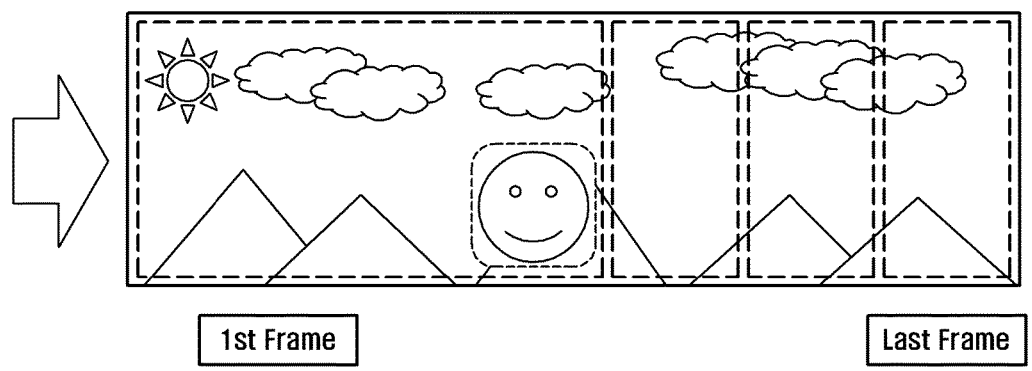
FIG. 4C is an abstract illustration of example panorama photography according to an example embodiment.

FIG. 3 is a flowchart illustrating an example sequence of steps for photographing a panorama image according to an example. FIGS. 4A to 4C are abstract illustrations of example panorama photography according to an example embodiment.

Referring to FIG. 3, the activation of the image sensors may be received through the input unit 140, and in response, the controller 100 may perform a preview mode at operation 311, displaying a dual mode preview on the display. The controller 100 may display an image sensor button and a dual button on a preview screen in the preview mode. The image sensor button selects an image sensor for photographing an image which is displayed as a main image, and a dual button activates and deactivates "dual-mode." The image sensor button and the dual button may be operated via switch or toggle. If the first image sensor 120 is selected by the image sensor button, the controller 100 may select the first image sensor 120 as the source of the main image. Further, if the user touches a dual button when the first image sensor 120 is selected, the controller 100 determines that the electronic device should be placed in "dual-mode," and may activate the second image sensor 125 at operation 417. The controller 100 may process and display an image acquired by the first image sensor 120 on the display unit 130 as a main image, and may process and resize the image acquired from the second image sensor 125 and display the resized image on a preset position of the display unit 130 as a sub-image. The controller 100 knows a size and a display position of the image displayed as the sub-image, and may overlay and display the sub-image at a preset position of the main image according to a preset size. In this case, the display position and the size of the sub-image may be set with a default display position and a default size, and the display position and/or the display size may be changed according to selection of the user. However, when a "dual-mode" is deactivated through toggle of the dual button when the first image sensor 120 is selected to output the main image, the controller 100 may process and display an image acquired from the first image sensor 120 on the display unit 130. Accordingly, the second image sensor 125 may be deactivated. Furthermore, when the user selects the second image sensor 125 by using the image sensor button, the controller 100 may process an image acquired from the second image sensor 125 and display the processed image on the display unit 130 as a main image, and process and resize the image acquired from the first image sensor 120 and display the resized image at a preset position of the display unit 130 as a sub-image. Otherwise, it is generally assumed (for the purposes of simplicity of disclosure) that a first image generated from the first image sensor 120 is selected as a main image, and "dual-mode" is activated. Accordingly, the controller 100 may process a first image output from the first image sensor 120 in a preview mode and display the processed first image on the display unit 130 as a main image, process and display a second image photographed from the second image sensor 125 on a sub-image display region. In this case, the controller 100 may include an image signal processor, and the image signal processor may include an image preprocessor, a postprocessor, an image scaler, a CODEC, and the like. The first image output from the first image sensor 120 may be pre-processed and post-processed by the image signal processor and be scaled to a main image size of the display unit 130 by the image scaler to output on the display. The second image output from the second image sensor 125 may be pre-processed and post-processed by the image signal processor and be scaled to a sub-image size of the display unit 130 by the image scaler to output to display.

The controller 100 may display a photography mode button capable of panorama photography on a preview screen of the display unit 130 in the preview mode. Further, the panorama photographing mode may include a mode to panorama photograph an image of a main image (i.e., a "first panorama photographing mode" according to an example embodiment of the present disclosure), and a mode to panorama photograph an image of a main image and a sub-image (i.e., a "second panorama photograph mode"). Further, the second panorama photograph mode may support a simultaneous photograph mode and a sequential photograph mode. In this case, if a first panorama photographing is requested in the preview mode, the controller 100 may detect this request at operation 313, and buffer a main image generated from the first image sensor 120 at operation 315. Again, the user rotates the electronic device while maintaining the same elevation as the first image sensor 120 captures a series of frames. The vertical orientation (i.e., tilt) or the horizontal orientation (i.e. scan) should not be rapidly changed to ensure the best quality panorama image. Rotation of the electronic device at constant speed ensures a consistent ratio of overlapping image portions.

Further, the controller 100 displays a buffered image generated from the first image sensor 120 on the display unit 130 as a main image, and processes the image generated from the second image sensor 125 as a sub-image, displaying the processed image on the display unit 130 as a sub-image at operation 315.

As mentioned above, when the image output from the first image sensor 120 is buffered, and a time-based scheme is being utilized to determine the appropriate time within which to capture a user's face, then when the predetermined time point is reached, the controller 100 executes capture and processing of a second image output from the second image sensor 125, as illustrated in reference numeral 220 of FIG. 4A to buffer at operation 319, thereby capturing the user's face.

The photographing time point of the second image may be a time point defined by a total length of the panorama photographing request, a time point of panorama photographing termination, or another preset time point. In one example embodiment of the present disclosure, the second image is captured by using a timer. In this case, when the panorama photographing is requested at operation 313, the controller 100 operates the timer. When the timer reaches termination, the controller 100 may detect the termination at operation 317 and capture a second image at operation 319. In this manner, if the timer is used, a time may be provided to set the desired frame of the second image, after the user initiates photography of a main image as a panorama image.

After capturing the second image, the controller 100 may display the captured still image as the sub-image image on the display unit 130, or may display a preview image output from the second image sensor 125. In an example embodiment of the present disclosure, the sub-image image is displayed as a preview image while the panorama image is photographed. Accordingly, the controller 100 may display the first image output from the first image sensor 120 as a main image while buffering the first image and display a second image output from the second image sensor 125 on the display unit 130 as a sub-image.

If panorama photography is terminated while in the above state, the controller 100 detects the termination of panorama photography at operation 321, processes the first image which is being buffered to generate a panorama image, and composes the captured second image with the panorama image, encodes it and stores the composite image in the storage unit 110 at operation 323. Here, panorama photography may be executed using a toggled shutter-switch, or with a preset time via a timer. In the first case, deactivation of the shutter-switch is detected as a termination of panorama photographing. In the second case, if the preset timer reaches termination, this is interpreted as termination of the panorama photographing.

Upon termination of panorama photography, the controller 100 may generate a panorama image as illustrated in reference numeral 210 of FIG. 4A by compositing adjacent frame images while removing overlapping portions from the adjacent frame images of the main image buffered in operation 323. Further, the controller 100 may composite a sub-image 220 with the resulting panorama image 210, display the composited image on the display unit 130 and store it in the storage unit 110. When the sub-image 220 is composed with the panorama image 210, the controller 100 may composite the sub-image 220 in a number of possible frames, such as the final frame position of the panorama image 210 as illustrated in FIG. 4B, at a first frame position of the panorama image 210 as illustrated in FIG. 4C, or at some intermediary preset frame of the panorama image.

If a drive termination request is generated while in preview mode, the controller 100 detects this request in operation 331 and may terminate the operation of dual mode in operation 333.

As described above, as shown in FIG. 4A, a first panorama photography method according to the embodiment of the present disclosure continuously photographs and buffers main image, captures a sub-image during panorama photographing (which may be placed in a first, intermediary, or final frame position), generates a panorama image by compositing the buffered adjacent main images upon termination of the panorama photographing, and composite the sub-image with the panorama image.

The controller 100 may generate a panorama image while photographing a panorama, and capture and compose the sub-image at a frame position set during when a panorama image is generated. That is, the controller 100 processes frame images output from the first image sensor 120 in a first panorama photographing mode, and generates a panorama image while removing portions of each image that overlap a previous frame. In addition, in a composition frame of the sub-image, the controller 100 may capture a second image output from the second image sensor 125 and compose with a corresponding frame interval.

If a panorama photographing mode is performed as described above, the controller 100 may generate a panorama image composed with a second image when the first panorama photographing is terminated. In this case, when the sub-image is composed in a state in which the panorama photographing is performed, if a face of the user is not inserted in a first frame but the user attempts to insert the user's face in an additional composition frame, an image of a front image sensor 120 may be composed with a corresponding composition frame if photographing of the front image sensor 120 is performed during panorama photographing as illustrated in FIG. 4B. Further, in order to insert the face of the user in the first frame, as shown in FIG. 4C, the first frame is composed by dual camera photographing and remaining panorama composition frames may be composed by only main camera photographing.

Figure 5:
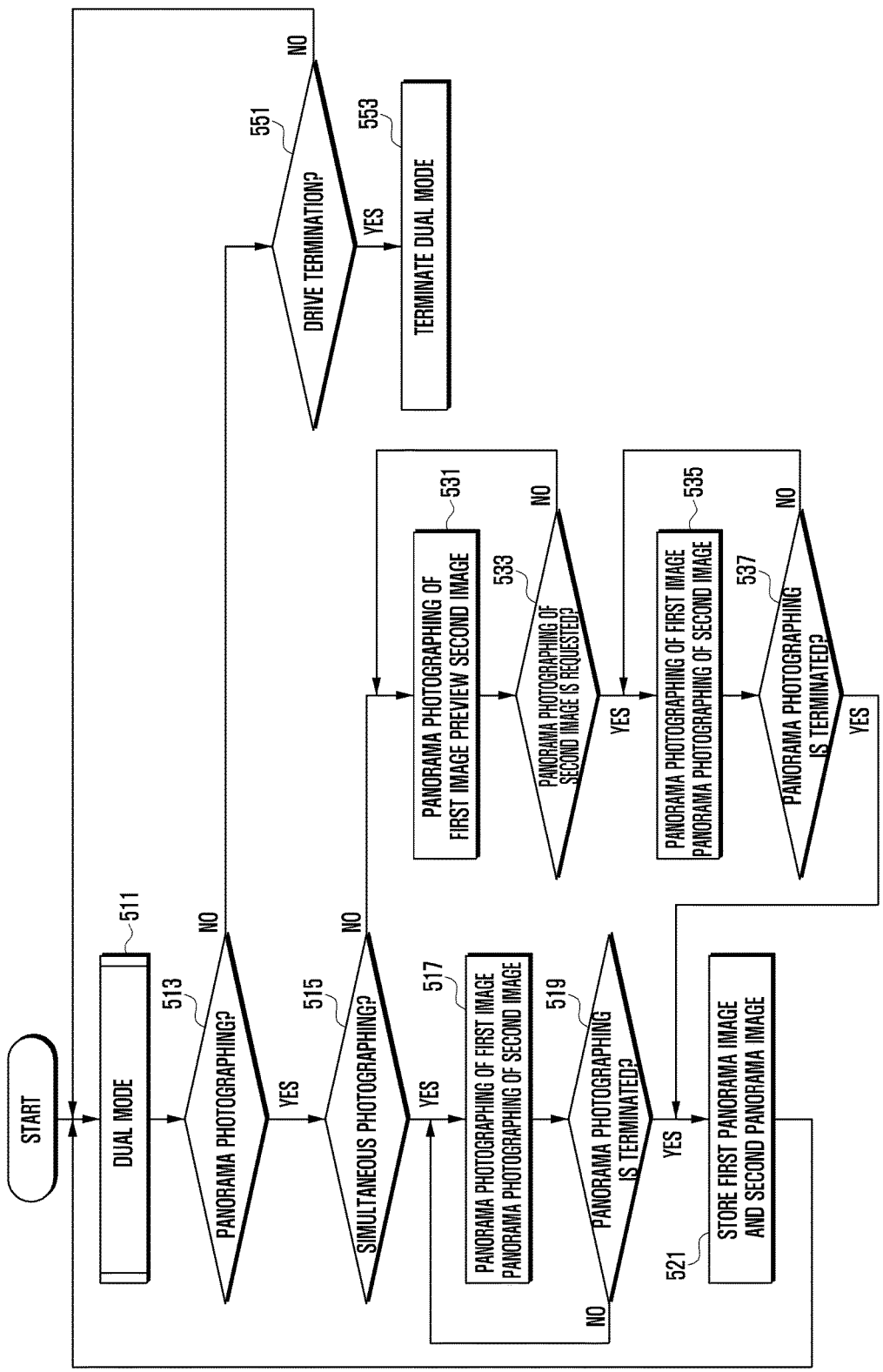
FIG. 5 is a flowchart illustrating an example sequence of steps for photographing a panorama image according to an example embodiment.
Figure 6A:
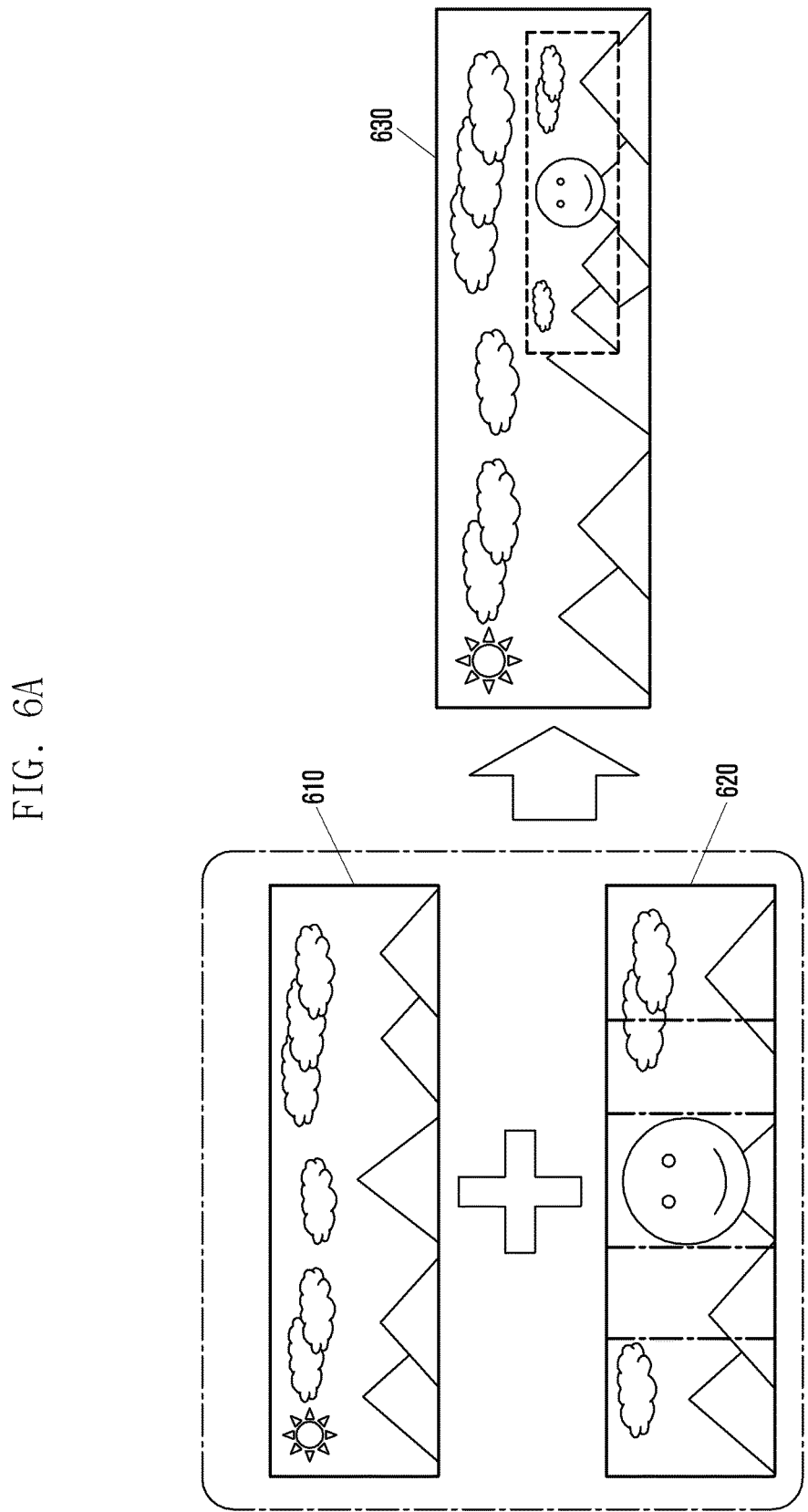
FIG. 6A is an abstract illustration of example panorama photography according to an example embodiment.
Figure 6B:
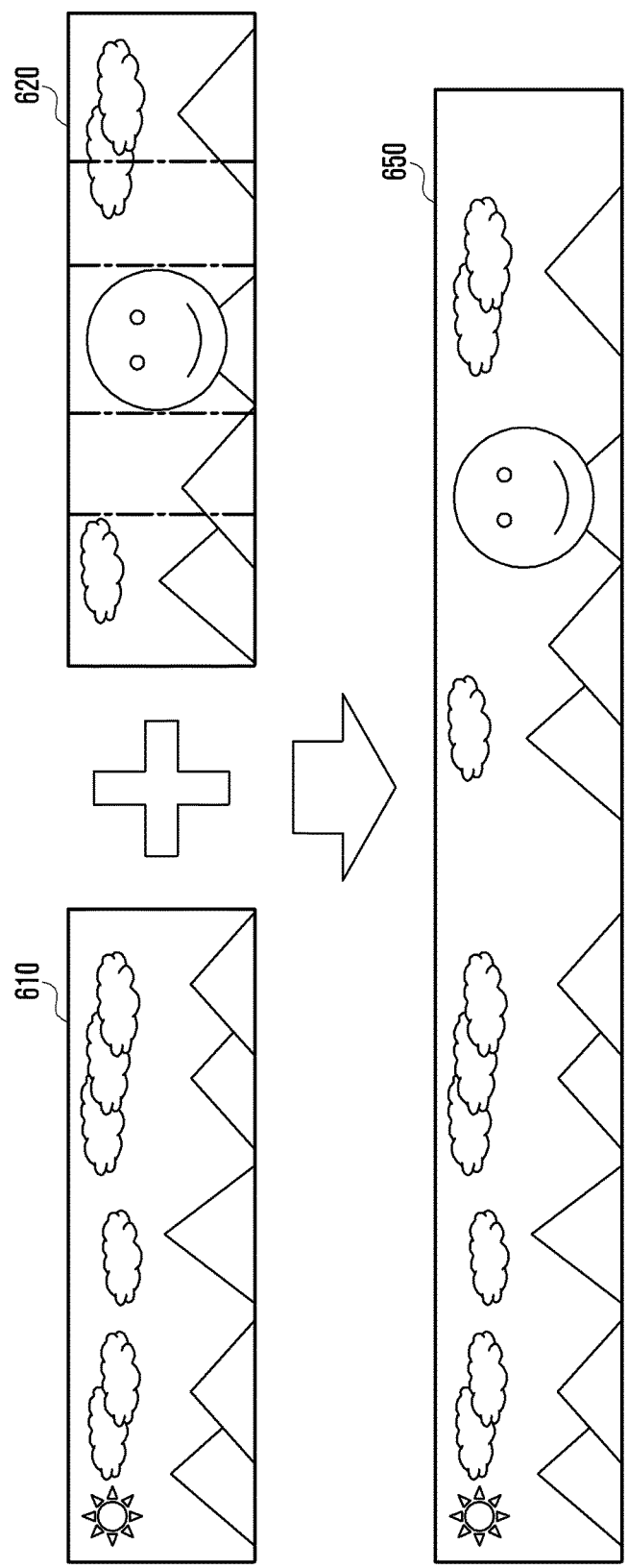
FIG. 6B is an abstract illustration of example panorama photography according to an example embodiment.

FIG. 5 is a flowchart illustrating an example sequence of steps for photographing a panorama image according to an example embodiment. FIGS. 6A and 6B are abstract illustrations of example panorama photography according to an example embodiment.

Referring to FIG. 5, if a dual mode is activated through the input unit 140, the controller 100 may execute a preview mode at operation 511. An operation in the preview mode may be performed by the same method as that of operation 311 shown in FIG. 3.

In this case, if the second panorama photographing is requested in the preview mode, the controller 100 detects this request at operation 513 and may determine a desired photographing method to execute the second panorama photographing mode at operation 515. The desired photographing method may be simultaneous photography and sequential photography. Simultaneous photography concurrently processes a first image and a second image output from the first image sensor 120 and the second image sensor 125 as a panorama image when panorama photographing is requested. Sequential photography is a method which processes a first image output from the first image sensor 120 as a panorama image, and processes a second image output from the second image sensor as a panorama image when photography is requested (meaning the time in which the shutter switch is activated or a timer ends).

If simultaneous photography mode is indicated, the controller 100 detects the simultaneous photography mode at operation 515, and may buffer a main image generated from the first image sensor 120, and a second image generated from the second image sensor 125 at operation 517. In the second panorama photography mode, the electronic device preferably captures frames as it is rotated along the same elevation and rotated with a constant speed. The electronic device should not be rapidly changed vertically (i.e., tilted) or horizontally (i.e., scanned). The resulting captured frame images may therefore overlap one another with a certain ratio. At operation 517, while buffering the first and second images output from the first image sensor 120 and the second image sensor 125, the controller 100 may display the first and second images output from the first image sensor 120 and the second image sensor 125 on the display unit 130 as a preview image.

If panorama photography is terminated in the above state, the controller 100 detects the termination of panorama photography at operation 519. The controller 100 may process a first image and a second image which are being buffered respectively to generate a main image panorama image and sub-image panorama image, compose the sub-image panorama image with the main image panorama image, and encode and store the composition image in the storage unit 110 at operation 521. Here, panorama photography may be performed when a shutter-switch is turned on or during a preset time. In the former case, if the shutter switch is turned off, the controller 100 detects the termination of the panorama photography. In the latter case, if the preset time elapses, the controller 100 may detect this as a termination of the panorama photography.

Returning now to step 515, if the controller 100 detects the desired mode as the sequential photography mode at operation 515, the controller 100 may buffer a main image generated from the first image sensor 120 at operation 531. Further, the controller 100 displays the buffered image generated from the first image sensor 120 on the display unit 130 as a main image at operation 531. In addition, the controller 100 may process the image generated from the second image sensor 125 as the sub-image and display the processed image on the display unit 130 as the sub-image.

Next, when panorama photography of the second image is requested at operation 533, the controller 100 may buffer second images output from the second image sensor 125 at operation 535. That is, if a time point has been set for panorama photography of the second image when first images output from the first image sensor 120 are buffered, the controller 100 may start to buffer the first image and the second image at the corresponding time point.

The time point of panorama photography of the second image may be the end time of the timer or a time point when a shutter-switch is activated. In one embodiment of the present disclosure, it is assumed that panorama photography of the second image is conducted while using the timer. In this case, when the panorama photography of the first image is requested at operation 515, the controller 100 operates a timer to control the panorama photography function. When the timer is terminated, the controller 100 detects the termination of timer at operation 533 and starts panorama photography of the second image at operation 535. As described above, if the timer is used, the user may initiate photography of the main image and then steadily and continuously perform panorama photography of the second image without rapid or sudden movements of the electronic device. Further, when the second image includes a face of the user, a critical time may be designated to set the frame of the second image in which the user's face will appear to ensure capture of the user's face after the first image sensor 120 is activated.

If termination of panorama photography is requested while panorama photography of the first and second images, the controller 100 processes the first image and the second image being buffered at operation 517 to generate a panorama image, composes the captured second image with the panorama image, and encodes and stores the composition image in the storage unit 110. A user image may be repeatedly included in an image output from the first image sensor 120 and the second image sensor 125 for each frame. The second image photographed from the second image sensor 125 may be an image including a face of a photographer.

In this case, it may be preferable that the repeatedly included person image is used for only a specific frame when generating the panorama image. Accordingly, in the case of an image including a user image, the controller 100 detects a face region with respect to respective frame images buffered when generating the panorama image to extract a face image, inserts the face image into one frame image, and composes images of remaining frames except for a corresponding frame containing the user's face to generate a panorama image.

Generally, face recognition includes a face region extraction to extract the region of face images among photographed images and a recognition function to determine the identity of face images among face images searched from the extracted face region. The face region extraction may use information such as location estimation of brightness, movement, colors, eyes (nose, mouth, ear, and the like) in order to distinguish a face from a background, and may include a plurality of other information types unlisted herein to accommodate various unknown variables. That is, in order to exactly extract a face region, a method of mutual compensation after collection of two or more information points may be used. The controller 100 may include a face recognition unit having a face region extraction function to determine the region of face among whole photograph image.

As described above, after a face region is detected from the buffered image, the controller 100 connects the images including the face region not to be overlapped with each other when buffered images of each frame is generated as a panorama image, and inserts a person image including the face region into a specific frame. Further, the controller 100 may compose a panorama image of the second image with a panorama image of the first image, and encodes and stores the composition image in the storage unit 110 at operation 521.

In this case, the panorama image of the first image is illustrated in reference numeral 610 of FIGS. 6A and 6B, and the panorama image of the second image is illustrated in reference numeral 620 of FIGS. 6A and 6B. In the first case, when the panorama image of the second image is composed with the panorama image of the first image, a sub-image panorama image is composited with the main image panorama image in a PIP type format, as illustrated in reference numeral 630 of FIG. 6A, or, in the second case, in a parallel or sequential format, as illustrated in reference numeral 650 of FIG. 6B.

Furthermore, if an image sensor drive termination request is generated while in the preview mode, the controller 100 may detect this request at operation 551 and terminate a dual mode at operation 553.

As described above, if the second panorama photographing mode is performed, the controller 100 controls the first image sensor 120 and the second image sensor 125 to simultaneously or sequentially perform a panorama function. The controller 100 composes the panorama image of the second image sensor 125 with a panorama image of the first image sensor 120 to create a panorama shot in a PIP type format, as illustrated in FIG. 6A. In this case, if an image containing a user or person (or a "person image") is captured by the second image sensor 125 when performing panorama photography of the second image sensor 125, the controller 100 may generate a panorama image by extracting only a background image except for the person image.

Further, if a person image is not captured by the second image sensor 125, the controller 100 may generate a dual panorama image by compositing with a panorama image of the first image sensor 120 after photographing a panorama by using existing panorama photography methods.

Further, as illustrated in FIG. 6B, the panorama image of the second image sensor 125 is composed with a panorama image of the first image sensor 120 in parallel or sequence to generate one panorama image. In this case, when the panorama photography is achieved by rotating the electronic device 180 degrees, a panorama image of 360 degrees may be created by compositing the panorama image of the first image sensor 120 with the panorama image of the second image sensor 125.

Figure 7:
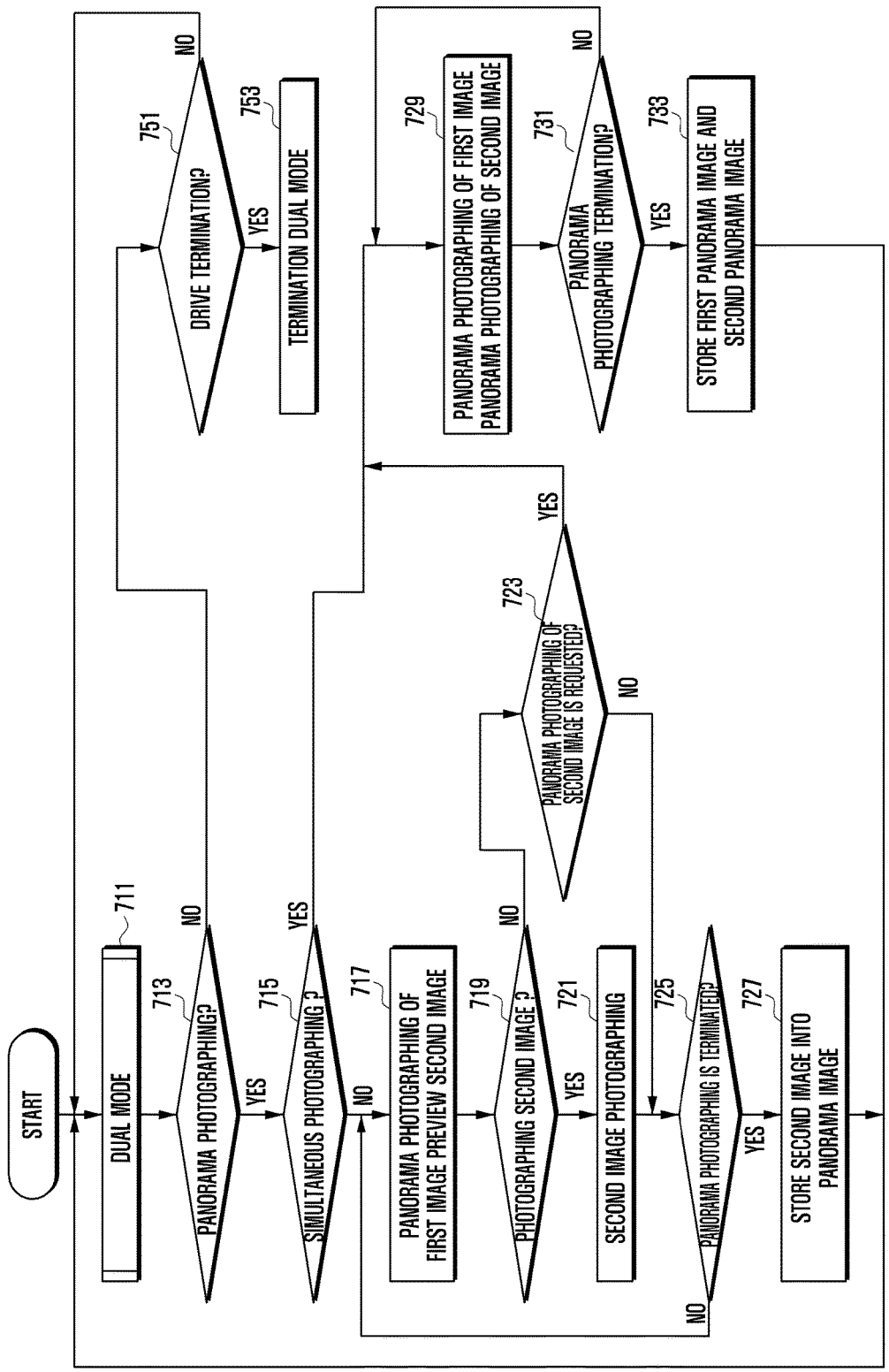
FIG. 7 is a flowchart illustrating an example sequence of steps for performing example panorama photography according to an example embodiment.

FIG. 7 is a flowchart illustrating an example sequence of steps for performing example panorama photography according to an example embodiment.

Referring to FIG. 7, upon indicating that dual mode should be activated, the controller 100 performs a preview mode at operation 711, allowing the user to select a first panorama photography mode or a second panorama photography mode. If a panorama mode is activated at operation 713, the may select simultaneous photography or a sequential photography, and this selection may be indicated.

When the first panorama photography mode is selected, the controller 100 detects this first panorama photographing mode at operations 713 and 715, and the controller 100 executes panorama-photography of a main image output from the first image sensor 120 at operation 717. If a pre-indicated time point to photography a sub-image is detected at operation 719, the controller 100 may capture a second image output from the second image sensor 125 as a sub-image at operation 721. If termination of the first panorama photographing is requested, the controller 100 detects this requested at operation 725, generates the buffered first image as the panorama image at operation 727, and may composite the captured second image with the first panorama image (as illustrated above, for example, with respect to FIGS. 4B and 4C).

If simultaneous photography of the second panorama photography mode is selected, the controller 100 detects this simultaneous photographing mode at operations 713 and 715, buffers a first image output from the first image sensor 120 and a second image output from the second image sensor 125 at operation 729, and displays the images on the display unit 130 in the form of the main image and in the form of the sub-image. Further, upon termination of panorama photography, the controller 100 detects the termination of the panorama photographing at operation 731, and generates the buffered first image and second image as the panorama image to compose the images with each other at operation 733.

In addition, when the sequential photographing of the second panorama photographing mode is selected, the controller 100 detects the sequential photographing at operations 713 and 715. Then, the controller 100 may panorama-photograph the main image output from the first image sensor 120 at operation 717, and preview an image photographed from the second image sensor 125.

Further, when panorama photographing of the second image is requested at operation 723, the controller 100 may buffer a first image output from the first image sensor 120 and a second image output from the second image sensor 125 at operation 729, and may display the images on the display unit 130 in the form of a main image and a sub-image. In addition, upon termination of the panorama photographing, the controller 100 detects the termination of the panorama photographing at operation 731, generates the first image and the second image which are buffered as a panorama image to compose the second image with the first image at operation 733.

In this case, in a method of compositing a panorama image of the sub-image with a panorama image of the main image generated by simultaneous photographing or sequential photographing in a second panorama photographing mode, the sub-image panorama image may be composed with the main image panorama in a PIP type format as shown in FIG. 6A, and the sub-image panorama image may be composed with the main image panorama in parallel or sequence as shown in FIG. 6B. When a person image is included in each frame upon generation of the panorama image, the controller 100 may extract a face region as described above, and display a repeated person image in an image of a specific one frame, and configure an image of other frames with only a scene image.

Figure 8:
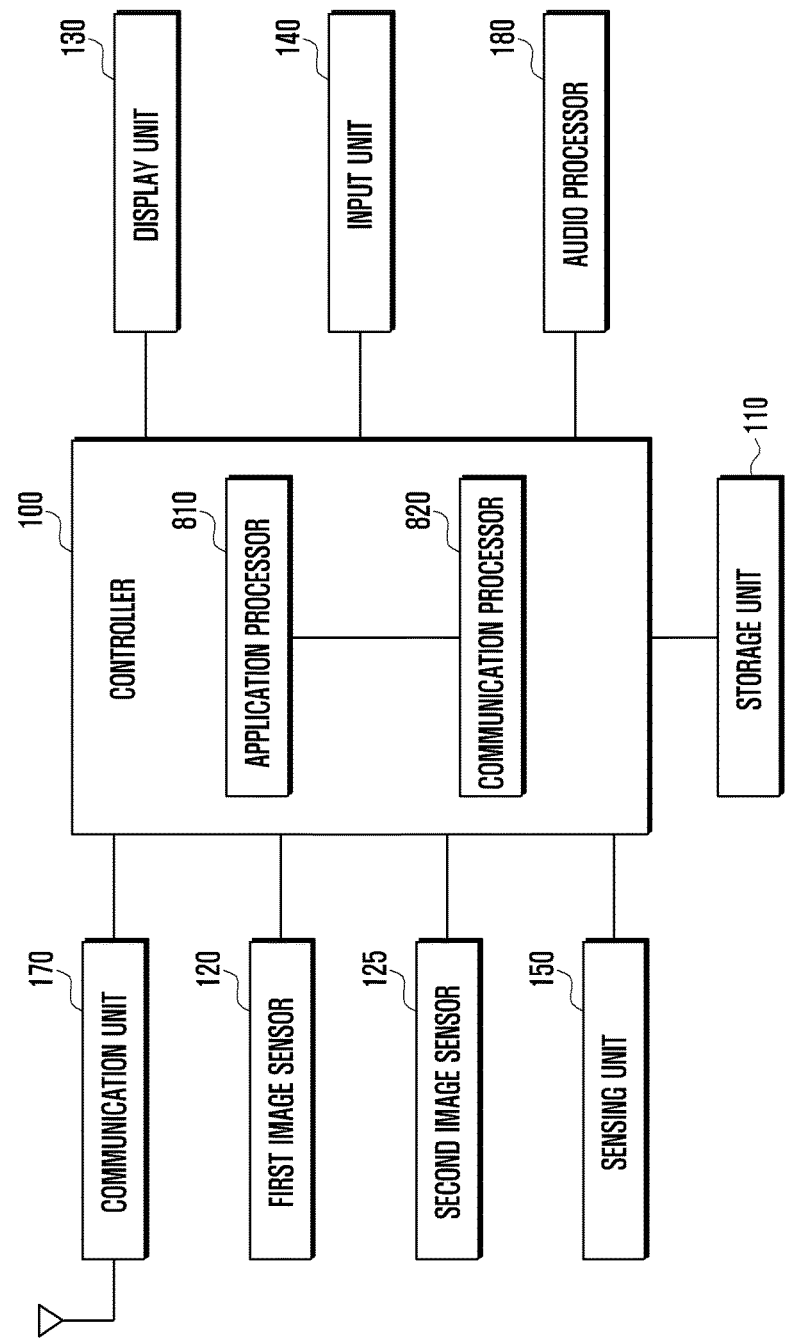
FIG. 8 is a block diagram illustrating an example configuration of a portable terminal according to an example embodiment.

FIG. 8 is a block diagram illustrating a configuration of a portable terminal performing a photographing operation according to an embodiment of the present disclosure. The portable terminal may include various digital devices such as a mobile phone including a smart phone, an MP3 terminal, a tablet PC, and a computer.

Referring to FIG. 8, the communication unit 170 may perform a wireless communication function with a base station or an Internet server. Here, the communication unit 170 may include a transmitter for up-converting a frequency of a transmission signal and amplifying a power of the signal, and a receiver for low-noise-amplifying a received signal and down-converting a frequency of the signal. Further, the communication unit 170 may include a modulator and a demodulator. The modulator may modulate the transmission signal to transfer to the transmitter, and the demodulator may demodulate a signal received through the receiver. In this case, the modulator/demodulator may include LTE, WCDMA, GSM, and the like, also include WIFI, WIBRO, and the like, and may include NFC, Bluetooth, and the like. In the embodiment of the present disclosure, it is assumed that the communication unit 170 includes LTE, WIFI, and Bluetooth communication units.

The first image sensor 120 is a rear image sensor which is mounted at a rear side of the terminal device, and may photograph an image of a high resolution. The second image sensor 125 is a front image sensor which is mounted at a front side of the terminal device, and may photograph an image of a resolution which is relatively lower than the resolution of the first image sensor 120.

The controller 100 may control an overall operation of the portable terminal, and may include an application processor (AP) 810 to control processing of various applications in the portable terminal and a communication processor (CP) 820 to control a communication function of the portable terminal. Further, the application processor 810 controls to display the first image and the second image as a main image and a sub-image in the preview mode of the dual mode. In addition, according to the embodiment of the present disclosure, in the panorama photography mode, the application processor 810 generates the first image and/or the second image as a panorama image and composites the first and second images before storing the composition image.

The storage unit 110 may include memory to store an operating system of the terminal and a photography program according to the embodiment of the present disclosure, and a storage memory to store tables and other data structures for the operation of the terminal, and data generated during execution of the program.

The display unit 130 may display executed application information under control of the controller 100. Furthermore, the display unit 130 may display preview images of a main image and a sub-image under control of the controller 100 in a "dual-mode". The display unit 130 may be configured as an LCD or an OLED type display. The input unit 140 may be implemented by a capacitive type or a resistive type touch screen. The input unit 140 may output location information of a user touch (referred to as "finger touch") to the controller 100. Further, the input unit 140 may further include an EMR sensor pad, and detect a pen touch input and output the detected pen touch input to the controller 100. The display unit 130 and the input unit 140 may be configured as an integral type. A sensing unit 150 may include sensors to sense motion of the portable terminal. The sensing unit 150 may be configured with an acceleration sensor, a geomagnetic sensor, a gyro sensor, and/or a location sensor. The audio processor 180 may process a voice signal generated in a communication mode under control of the controller 100.

The controller 100 of the portable terminal having a construction as described above may include an image sensor button to select an image sensor for displaying a main image on a display unit 130 and a dual button to turn the setting of the "dual-mode" on/off. When a user turns the dual button on, the controller performs a "dual-mode" to drive the first image sensor 120 and the second image sensor 125, and may display images output from the image sensors 120 and 125 on the display unit 130 as a dual image of a main image and a sub-image. Further, the controller 100 may select an image sensor to output a main image by selecting an image sensor button in a "dual-mode." In the embodiment of the present disclosure, it is assumed that the first image sensor 120 is selected as the main image sensor and the second image sensor 125 is selected as the sub-image sensor, when the portable terminal is driven in "dual-mode."

When the portable terminal drives a "dual-mode" in a preview mode, the controller 100 may display a first image generated from the first image sensor 120 on the display unit 130 and may display a second image generated from the second image sensor 125 as a sub-image. Further, the controller 100 may display a photography mode selection button including a panorama photography mode on the preview screen. In the embodiment of the present disclosure, the panorama photography mode includes a first panorama photography mode to photograph the images photographed from one image sensor of the dual image sensor as a panorama image, and a second panorama photography mode to photograph both of the first image and the second image photographed from the dual image sensor as a panorama image. The second panorama photography mode may perform simultaneous photography or sequential photography.

If a first panorama photography mode is selected in a preview mode of "dual-mode," the controller 100 buffers a first image output from the first image sensor 120 (while performing a sequence of steps illustrated by FIG. 3), displays the first image on the display unit 130 as a main image, and previews the second image output from the second image sensor 125 as a sub-image. Further, the controller 100 may capture a second image of the second image sensor 125 to generate a sub-image in a preset frame as a still image.

The controller 100 may include a timer. When requesting panorama photography, the controller 100 may activate the timer, and capture the second image when the timer terminates. Further, upon termination of panorama photography, the still image may be composed with the panorama image as a sub-image. In this case, a position of the sub-image composed with the panorama image may be a first frame interval of the panorama image as illustrated in FIG. 4B, a final frame interval as illustrated in FIG. 4C or an intermediary frame interval. The sub-image may be composed with the panorama image in a PIP type format. The sub-image may also be composed with the panorama image in a parallel or sequential format.

If the second panorama photographing mode is selected in a preview mode of "dual-mode," the controller 100 buffers the first and second images of each frame generated from the first image sensor 120 and the second image sensor 125, and may display the first and second images as a main image and a sub-image on the display unit 130. In this case, the user may perform a photography mode while rotating the portable terminal at constant speed and steady elevation to photograph a panorama image. Upon terminating panorama photography, the controller 100 may remove overlapped portions of each image from the buffered first and second images to generate a panorama image of the main image and a panorama image of the sub-image, compose the two panorama images with each other, and store the composite image. The second image generated from the second image sensor 125 may include an image of a photographer repeated in every frame. In this case, it may be preferable that the person image is displayed on only one frame image interval. Accordingly, when generating the second panorama image, the controller 100 may compose one frame image including a face of the photographer with images of remaining frames that exclude the photographer to generate a panorama image through detection of a face included in the second image.

Further, when photographing the first and second panorama images, the controller 100 may generate a panorama image by simultaneous photography of images using the first image sensor 120 and the second image sensor 125. In addition, the controller 100 may photograph a first panorama image and then photograph a second panorama image by parallel or sequential photography.

In the latter case, when an photography operation of the second panorama image is performed in a state in which the first panorama image is being photographed, a first panorama photographing operation because of the requirement of rotating the camera at a constant speed while maintaining a uniform elevation.

Accordingly, in case of sequential photographing, the controller 100 may include a timer when photographing the panorama image, which may buffer a second image of every frame generated from the second image sensor 125 when the timer terminates (i.e., concurrent with the panorama photography) to photograph the second panorama image. When compositing the first panorama image with the second panorama image, the controller 100 may compose the second panorama image with the first panorama image in a PIP type format, or may compose the second panorama image with the first panorama image in parallel or sequential format.

The electronic device equipped with a plurality of image sensors may select an image obtained from the image sensor to generate a panorama image, and may compose the generated panorama image with the image photographed by other image sensor. In this case, panorama image or still image may be generated and composed by selectively driving the plurality of image sensors. Further, the output of each image sensor may be generated as the panorama image to compose.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

Although exemplary embodiments of the present disclosure have been described in detail hereinabove, it should be clearly understood that many variations and modifications of the basic inventive concepts herein taught which may appear to those skilled in the present art will still fall within the spirit and scope of the present disclosure, as defined in the appended claims.

What is claimed is:

1. A method of photography, the method comprising:
   buffering a series of first images from a first image sensor and a series of second images from a second image sensor;
   assembling the series of first images into a first panorama image;
   detecting a region including a user's face in the series of first images and/or the series of second images;
   assembling an image of the region including the user's face using one or more images from the series of first images and/or the series of second images;
   assembling the series of second images into a second panorama image, wherein the second panorama image is composited with a portion of the first panorama image;
   displaying a composition panorama image on a display by compositing at least a portion of the series of second images with at least a portion of the first panorama image, wherein the one or more images used for assembling the image of the region including the user's face are entirely excluded from the composition panorama image; and
   displaying the image of the region including the user's face within a first frame, an intermediary frame or a final frame of the composition panorama image.

2. The method of claim 1, further comprising buffering at least a portion of the series of second images in response to a timer.

3. The method of claim 1, wherein the portion of the series of second images is composited with the portion of the first panorama image according to a picture-in-picture format.

4. A method of photography, comprising:
   buffering a series of first images from a first image sensor and a series of second images from a second image sensor;
   assembling the series of first images into a first panorama image, and the series of second images into a second panorama image, wherein the second panorama image is composited with a portion of the first panorama image;
   detecting a region including a user's face in the series of first images and/or the series of second images;
   assembling an image of the region including the user's face using one or more images from the series of first images and/or the series of second images;
   displaying a composition panorama image on a display by compositing at least a portion of the first panorama image with at least a portion of the second panorama image, wherein the one or more images used for assembling the image of the region including the user's face are entirely excluded from the composition panorama image; and
   displaying the image of the region including the user's face within a first frame, an intermediary frame or a final frame of the composition panorama image.

5. The method of claim 4, further comprising buffering each of the series of first images and the series of second images according to a timer.

6. The method of claim 4,
   wherein the image of the user's face is positioned within the composition panorama image according to a user preset.

7. The method of claim 4, wherein the portion of the first panorama image is composited with the portion of the second panorama image according to a picture-in-picture format.

8. The method of claim 4, wherein the portion of the first panorama image is composited with the portion of the second panorama image according to a parallel format.

9. An apparatus for photographing an image, comprising:
   a first image sensor and a second image sensor;
   a display unit; and
   a controller configured to:
   buffer a series of first images from the first image sensor and a series of second images from the second image sensor,
   generate a first panorama image from the series of first images responsive to termination of panorama photography,
   generate a second panorama image from the series of second images, wherein the second panorama image is composited with a portion of the first panorama image;
   detect a region including a user's face in the series of first images and/or the series of second images,
   generate an image of the region including the user's face from one or more images from the series of first images and/or the series of second images, composite at least a portion of the series of second images with the first panorama image to generate a composition panorama image, wherein the one or more images used for assembling the image of the region including the user's face are entirely excluded from the composition panorama image; and display the image of the region including the user's face on the display unit within a first frame, an intermediary frame or a final frame of the composition panorama image.

10. The apparatus of claim 9, wherein the controller operates a timer, activated upon commencement of panorama photography, wherein the series of second images is buffered responsive to termination of the timer.

11. The apparatus of claim 9, wherein the portion of the series of second images is composited with the first panorama image according to a picture-in-picture format.

12. The apparatus of claim 9, wherein the portion of the series of second images is composited with the first panorama image in a parallel format.

13. The apparatus of claim 9, wherein the controller is further configured to:
- activate a timer responsive to a request for panoramic photography,
- buffer the series of first images while maintaining the timer, and
- generate the first panorama image and buffer the series of second images when the timer is terminated.

14. The apparatus of claim 9, wherein the composition panorama image is generated according to a picture-in-picture format.

15. The apparatus of claim 9, wherein the composition panorama image is generated according to a parallel format.

\* \* \* \* \*